(12) United States Patent
Al-Bahily et al.

(10) Patent No.: US 9,902,614 B2
(45) Date of Patent: Feb. 27, 2018

(54) LIGHT-SWITCHABLE CATALYST FOR THE HYDROGEN PRODUCTION FROM PARA-FORMALDEHYDE

(71) Applicant: SABIC Global Technologies B.V., Bergen op Zoom (NL)

(72) Inventors: Khalid Al-Bahily, Thuwal (SA); Balamurugan Vidjayacoumar, Thuwal (SA); Sandro Gambarotta, Ottawa (CA); Nicholas P. Alderman, Ottawa (CA)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/150,680

(22) Filed: May 10, 2016

(65) Prior Publication Data
US 2016/0340186 A1 Nov. 24, 2016

Related U.S. Application Data

(60) Provisional application No. 62/164,936, filed on May 21, 2015.

(51) Int. Cl.
*B01J 19/12* (2006.01)
*B01J 35/00* (2006.01)
(Continued)

(52) U.S. Cl.
CPC .............. *C01B 3/326* (2013.01); *B01J 19/122* (2013.01); *B01J 27/26* (2013.01); *B01J 35/004* (2013.01);
(Continued)

(58) Field of Classification Search
CPC ... C01B 3/326; C01B 2203/0277; C01B 3/22; C01B 2203/0261; C01B 2203/1047;
(Continued)

(56) References Cited

U.S. PATENT DOCUMENTS 3,404,109 A * 10/1968 Milgrom .................. B01J 27/26
502/167
4,414,182 A 11/1983 Okamoto et al. ............. 423/652
(Continued)

FOREIGN PATENT DOCUMENTS

CN 101428223 A 5/2009
CN 102962063 A * 3/2013
(Continued)

OTHER PUBLICATIONS

Yoshimizu et al, "Photocatalytic Hydrogen Evolution over β-Iron Silicide under Infrared-Light Irradiation," Chem. Commun. 2015, vol. 51, pp. 2818-2820.*
(Continued)

*Primary Examiner* — Keith D. Hendricks
*Assistant Examiner* — Colleen M Raphael
(74) *Attorney, Agent, or Firm* — Norton Rose Fulbright US LLP

(57) ABSTRACT

Disclosed is a method of producing hydrogen from formaldehyde, the method comprising obtaining an aqueous mixture having a basic pH and comprising formaldehyde, an iron containing photocatalyst, and a base, and subjecting the aqueous mixture to light to produce hydrogen ($H_2$) gas from the formaldehyde.

10 Claims, 9 Drawing Sheets

(51) Int. Cl.
 B01J 27/26 (2006.01)
 C01B 3/32 (2006.01)
 C01B 3/22 (2006.01)
(52) U.S. Cl.
 CPC ......... *C01B 3/22* (2013.01); *B01J 2219/1203* (2013.01); *C01B 2203/0261* (2013.01); *C01B 2203/0277* (2013.01); *C01B 2203/1047* (2013.01)
(58) Field of Classification Search
 CPC ........ B01J 19/122; B01J 27/26; B01J 35/004; B01J 2219/1203
 USPC .......................... 204/157.52, 157.47, 157.87
 See application file for complete search history.

(56) References Cited

U.S. PATENT DOCUMENTS

| | | | |
|---|---|---|---|
| 5,865,960 A * | 2/1999 | Park | B01J 23/20 204/157.52 |
| 2007/0068713 A1 | 3/2007 | Komura et al. | 180/65.3 |
| 2014/0295518 A1* | 10/2014 | Rayalu | C01B 31/18 435/168 |

FOREIGN PATENT DOCUMENTS

| | | | |
|---|---|---|---|
| EP | 0061578 A1 | | 10/1982 |
| JP | 03186348 A | * | 8/1991 |
| JP | 09262473 A | * | 7/1997 |
| JP | 2012024757 A | | 2/2012 |
| WO | WO 2014204200 | | 12/2014 |
| WO | WO 2015003680 | | 1/2015 |

OTHER PUBLICATIONS

Ortega Mendez et al, "Detoxification of waters contaminated with phenol, formaldehyde and phenol—formaldehyde mixtures using a combination of biological treatments and advanced oxidation techniques," Applied Catalysis B: Environmental, vol. 163 (2015), pp. 63-73.*
MacDonald et al, "Catalytic consequences of charge-balancing cations in zeolite during photo-Fenton oxidation of formaldehyde in alkaline conditions," Separation and Purification Technology vol. 125 (2014) pp. 269-274.*
Liu et al, "Kinetics and Reaction Pathways of Formaldehyde Degradation Using the UV-Fenton Method," Water Environment Research vol. 83, No. 5 (2011).*
Fonsecar et al, "Photo-Fenton process for treating biological laboratory wastewater containing formaldehyde," Ecl. Quim., Sao Paulo, 35(1): pp. 25-33, 2010.*
Joseph et al, "Photoproduction of hydroxyl radicals from Fe(III)-hydroxy complex: a quantitative assessment," J. of Photochemistry and Photobiology A: Chemistry 146 (2001) pp. 67-73 (Year: 2001).*
International Search Report and Written Opinion for PCT/IB2016/055175, dated Nov. 14, 2016.
Chowdhury et al., "Sacrificial Hydrogen Generation from Formaldehyde with Pt/TiO$_2$ Photocatalyst in Solar Radiation", *Ind. Eng. Chem. Res.* 52(14):5023-5029, 2013.
Kapoor et al., "Kinetics of Hydrogen Formation from Formaldehyde in Basic Aqueous Solutions", *J. Phys. Chem* 99(18):6857-6863, 1995.
Wang et al., "Novel microbial synthesis of Cu doped LaCoO$_3$ photocatalyst and its high efficient hydrogen production from formaldehyde solution under visible light irradiation", *Fuel* 140:267-274, 2015.
Bi et al., *International Journal of Hydrogen Energy* 33:2225-2232, 2008.
Heim et al., *Nature Communications* 5(3621):1-8, 2014.
International Search Report and Written Opinion for PCT/IB2016/052676, dated Aug. 3, 2016.
Li et al., *International Journal of Hydrogen Energy* 39:9114-9120, 2014.
First Office Action for CN201680000832.0 dated Apr. 28, 2017.

* cited by examiner

LIGHT-SWITCHABLE CATALYST FOR THE HYDROGEN PRODUCTION FROM PARA-FORMALDEHYDE

CROSS REFERENCE TO RELATED APPLICATIONS

This application claims the benefit of priority of U.S. Provisional Patent Application No. 62/164,936, filed May 21, 2015, which is hereby incorporated by reference in its entirety.

BACKGROUND OF THE INVENTION

A. Field of the Invention

The invention generally concerns a method for producing hydrogen from formaldehyde. In particular, an aqueous basic composition containing para-formaldehyde and an iron containing photocatalyst can be subjected to light to produce hydrogen gas ($H_2$) from the para-formaldehyde.

B. Description of Related Art

Conventional technology produces hydrogen from steam reforming of methane as shown in the equation (1) below. The major source of the methane is from natural gas.

$$CH_4 + H_2O = CO + 3H_2 \text{ and } CO + H_2O = CO_2 + H_2 \quad (1)$$

Due to the depletion of fossil fuels, there is a necessity to find the alternative feedstock to meet the growing demand for hydrogen production globally.

Alternative processes for hydrogen production have been proposed (for example, water-splitting, thermal dehydrogenation of formic acid, catalytic dehydrogenation of small organic molecules, thermal dehydrogenation of amino-boranes and the like). Dehydrogenation of small organic molecules such as formic acid, methanol and formaldehyde has been attempted. Dehydrogenation of formic acid into hydrogen and carbon dioxide suffers in that the reaction is inefficient as formic acid has a low hydrogen content (about 4.4 wt. %). Further, the production of carbon dioxide can be problematic.

As for methanol, while it has a high hydrogen content (12.5 wt. %), the dehydrogenation process suffers in that the catalysts used to promote the dehydrogenation are sensitive to air and easily decompose. Further, methanol reforming is conducted at high temperatures (200° C.) and pressures (>25 bar), thereby limiting the scalability of the process.

With respect to formaldehyde, while there have been attempts to use formaldehyde in hydrogen production processes, the processes can require additional materials and/or use high temperatures, thereby making the processes inefficient and difficult to scale-up for mass hydrogen gas production. By way of example, International Application Publication No. WO 2014/204200 to Yoon et al. describes the dehydrogenation of methanol in the presence of formaldehyde using a palladium oxide on titanium dioxide photocatalyst to produce hydrogen. International Application Publication No. WO 2015/003680 to Prechtl et al. describes thermal process for generating hydrogen by heating formaldehyde-containing wastewater at 95° C. in the presence of a catalyst having a dimeric form of ruthenium with aromatic hydrocarbon ligands. Wang et al. in "Novel microbial synthesis of Cu doped $LaCoO_3$ photocatalyst and its high efficient hydrogen production from formaldehyde solution under visible light irradiation," *Fuel*, 2015, Vol. 140, pp. 267-274 describes preparation of a copper doped $LaCoO_3$ using microorganisms. Kapoor et al. in "Kinetics of Hydrogen Formation from Formaldehyde in Basic Aqueous Solutions," *Journal of Physical Chemistry*, 1995, Vol. 99 describes the kinetics of thermal generation of hydrogen from solutions of formaldehyde in the form of HCHO, with an increase in hydrogen production observed by an increase in reaction temperatures. Notably, Kapoor et al. also explains that hydrogen production is from HCHO and trioxane and is not from para-formaldehyde.

In addition to the inefficiencies of the systems discussed above, photocatalytic attempts to produce hydrogen from aqueous formaldehyde solutions have typically relied on water splitting to generate electron holes that oxidize the formaldehyde to formic acid. Subsequent photooxidation of the formic acid produces hydrogen and carbon dioxide through a multi-step process shown in equations (2) through (8) below.

$$\text{Catalyst} \xrightarrow{h\nu} e^- + h^+ \quad (2)$$

$$H_2O + h^+ \xrightarrow{h\nu} H^+ + OH\cdot \quad (3)$$

$$2H^+ + 2e^- \xrightarrow{h\nu} H_2 \quad (4)$$

$$HCHO + h^+ + OH\cdot \xrightarrow{h\nu} HCO_2H + H^+ \quad (5)$$

$$HCO_2H + H^+ \longrightarrow HCO_2^- + H^+ \quad (6)$$

$$HCO_2^- + 2h^+ \xrightarrow{h\nu} CO_2 + H^+ \quad (7)$$

$$2H^+ + 2e^- \xrightarrow{h\nu} H_2 \quad (8)$$

SUMMARY OF THE INVENTION

A discovery has been made that provides a solution to the aforementioned problems and inefficiencies associated with the generation of hydrogen from small organic molecules such as formaldehyde. The discovery is premised on the use of a homogenous photochemical system that includes an aqueous basic solution having an iron containing photocatalyst and para-formaldehyde, both of which are solubilized in the basic solution. Hydrogen gas can be produced directly from para-formaldehyde by using a natural or an artificial light source. The system is oxygen-resilient, chemically robust, and energy efficient, thereby allowing for large scale hydrogen production to meet the ever increasing hydrogen gas demands of the chemical and petrochemical industries. In particular, the process of the present invention can (1) be activated and deactivated by light (e.g., light switchable), (2) avoid the costs associated with conventional photocatalysts that contain expensive noble metals (e.g., $Pd/TiO_2$), (3) be operated at reduced temperatures (e.g., room temperature conditions), and/or (4) can limit or avoid the production of by-products such as carbon dioxide. Without wishing to be bound by theory, it is believed that enhanced efficiency of the system is due to the fact that the $H_2$ evolution occurs in the homogeneous phase of the reaction mixture.

In a particular aspect, a method of producing hydrogen from formaldehyde is described. The method can include (a)

obtaining an aqueous mixture having a basic pH and including formaldehyde, an iron containing photocatalyst, and a base; and (b) subjecting the aqueous mixture to light to produce hydrogen ($H_2$) gas from the formaldehyde. The formaldehyde can be para-formaldehyde (p-formaldehyde) or hydrated formaldehyde (methanediol) or a combination of both. The molar ratio of formaldehyde to base is equal to or less than 2:1, preferably equal to or less than 1.5:1, more preferably equal to or less than 1.2:1, even more preferably from 0.5:1 to 1.5:1, or most preferably from 1:1 to 1.3:1. The iron containing photocatalyst can be homogenously present in the aqueous mixture. Said another way, the iron containing photocatalyst can be partially or fully solubilized in the aqueous mixture. The iron containing photocatalyst can be an Fe(II) containing catalyst. In a preferred embodiment, the Fe(II) containing catalyst can be $(Fe(CN)_6)^{4-}$ or a salt thereof. The pH of the aqueous mixture can range from 8 to 14, preferably 10 to 14, and most preferably 12 to 14. The pH of the aqueous mixture can be adjusted using a metal hydroxide base, preferably sodium hydroxide (NaOH). In some embodiments, formic acid can be produced and hydrogen gas can be further produced from the formic acid. The aqueous mixture can be subjected to sunlight, artificial light or a combination thereof. The artificial light can be from a xenon lamp, a fluorescent light, a light emitting diode (LED), and incandescent light, an ultraviolet light, or any combination thereof. The temperature of the aqueous mixture in step (b) ranges from greater than 0° C. to less than 50° C., preferably from 10° C. to 40° C., more preferably from 15° C. to 30° C., and most preferably from 20° C. to 25° C.

In another aspect of the present invention, an aqueous composition capable of producing hydrogen ($H_2$) gas from formaldehyde is described. The composition can include formaldehyde, an iron containing photocatalyst, and a base. The composition includes sufficient base to make the pH of the composition basic. The formaldehyde is preferably p-formaldehyde. The pH of the aqueous mixture can range from 8 to 14, preferably 10 to 14, and most preferably 12 to 14. The base can be a M(OH), where M is an alkali metal or an alkaline earth, preferably sodium hydroxide (NaOH). The molar ratio of formaldehyde to base can be equal to or less than 2:1, preferably equal to or less than 1.5:1, more preferably equal to or less than 1.2:1, even more preferably from 0.5:1 to 1.5:1, or most preferably from 1:1 to 1.3:1. The iron containing photocatalyst can be homogenously present in the aqueous composition. Said another way, the iron containing photocatalyst can be partially or fully solubilized in the aqueous composition. The iron containing photocatalyst can be an Fe(II) containing catalyst. In a preferred embodiment, the Fe(II) containing catalyst can be $(Fe(CN)_6)^{4-}$ or a salt thereof. In some embodiments, formic acid can be produced and hydrogen gas is further produced from the formic acid. The aqueous composition can be subjected to sunlight, artificial light or a combination thereof. The artificial light can be from a xenon lamp, a fluorescent light, a light emitting diode (LED), and incandescent light, an ultraviolet light, or any combination thereof. The temperature of the aqueous mixture can range from greater than 0° C. to less than 50° C., preferably from 10° C. to 40° C., more preferably from 15° C. to 30° C., and most preferably from 20° C. to 25° C.

In another aspect of the invention, a system for producing hydrogen ($H_2$) gas from formaldehyde is described. The system can include (a) a container comprising the composition described throughout the specification; and (b) a light source for illuminating the composition. The light source can be sunlight, an artificial light source, or a combination thereof. The artificial light can be a xenon lamp, a fluorescent light, a light emitting diode (LED), and incandescent light, an ultraviolet light, or any combination thereof. The container can include a transparent portion or an opaque portion or a combination thereof. In the methods, compositions and system described throughout the specification, an external bias is not included or used to produce the hydrogen gas.

Also disclosed in the context of the present invention are embodiments 1 to 30. Embodiment 1 is a method of producing hydrogen from formaldehyde, the method comprising: (a) obtaining an aqueous mixture having a basic pH and comprising formaldehyde, an iron containing photocatalyst, and a base; and (b) subjecting the aqueous mixture to light to produce hydrogen ($H_2$) gas from the formaldehyde. Embodiment 2 is the method of embodiment 1, wherein the molar ratio of formaldehyde to base is equal to or less than 2:1, preferably equal to or less than 1.5:1, more preferably equal to or less than 1.2:1, even more preferably from 0.5:1 to 1.5:1, or most preferably from 1:1 to 1.3:1. Embodiment 3 is the method of any one of embodiments 1 to 2, wherein the iron containing photocatalyst and the formaldehyde are each homogenously present in the aqueous mixture. Embodiment 4 is the method of embodiment 3, wherein the iron containing photocatalyst and the formaldehyde are each partially or fully solubilized in the aqueous mixture. Embodiment 5 is the method of any one of embodiments 1 to 4, wherein the formaldehyde is para-formaldehyde, hydrated formaldehyde, or a combination thereof. Embodiment 6 is the method of any one of embodiments 1 to 5, wherein the iron containing photocatalyst is an Fe(II) containing catalyst. Embodiment 7 is the method of embodiment 6, wherein the Fe(II) containing photocatalyst comprises ferrocyanide $(Fe(CN)_6)^{4-}$ or a salt thereof. Embodiment 8 is the method of any one of embodiments 1 to 7, wherein the base is NaOH. Embodiment 9 is the method of any one of embodiments 1 to 8, wherein the mixture has a pH from 8 to 14, preferably 10 to 14, and most preferably 12 to 14. Embodiment 10 is the method of any one of embodiments 1 to 9, wherein the method further produces formic acid, and wherein $H_2$ gas is further produced from the formic acid. Embodiment 11 is the method of any one of embodiments 1 to 10, wherein the light is sunlight or artificial light, or a combination thereof. Embodiment 12 is the method of claim 11, wherein the artificial light is from a xenon lamp, a fluorescent light, a light emitting diode (LED), an incandescent light, an ultraviolet (UV) light, or any combination thereof. Embodiment 13 is the method of any one of embodiments 1 to 12, wherein the temperature of the mixture in step (b) ranges from greater than 0° C. to less than 50° C., preferably from 10° C. to 40° C., more preferably from 15° C. to 30° C., and most preferably from 20° C. to 25° C. Embodiment 14 is the method of any one of embodiments 1 to 13, wherein an external bias is not used to produce $H_2$ gas.

Embodiment 15 is An aqueous composition capable of producing hydrogen ($H_2$) gas from formaldehyde, the composition comprising formaldehyde, an iron containing photocatalyst, and a base, wherein the composition has a basic pH. Embodiment 16 is the aqueous composition of claim 15, wherein the molar ratio of formaldehyde to base is equal to or less than 2:1, preferably equal to or less than 1.5:1, more preferably equal to or less than 1.2:1, even more preferably from 0.5:1 to 1.5:1, or most preferably from 1:1 to 1.3:1. Embodiment 17 is the aqueous composition of any one of claims 15 to 16, wherein the iron containing photocatalyst and the formaldehyde are each homogenously present in the aqueous composition. Embodiment 18 is the aqueous composition of claim 17, wherein the iron containing photocatalyst and the paraformaldehyde are each partially or fully solubilized in the aqueous composition. Embodiment 19 is the aqueous composition of any one of embodiments 15 to 18, wherein the formaldehyde is para-formaldehyde, hydrated formaldehyde, or a combination thereof. Embodiment 20 is the aqueous composition of any one of embodiments 15 to 19, wherein the iron containing photocatalyst is an Fe(II) containing catalyst. Embodiment 21 is the aqueous composition of embodiment 20, wherein the Fe(II) containing photocatalyst comprises ferrocyanide $(Fe(CN)_6)^{4-}$ or a salt thereof. Embodiment 22 is the aqueous composition of any one of embodiments 15 to 21, wherein the base is NaOH. Embodiment 23 is the aqueous composition of any one of embodiments 15 to 22, wherein the mixture has a pH from 8 to 14, preferably, 10 to 14, and most preferably 12 to 14. Embodiment 24 is the aqueous composition of any one of embodiments 15 to 23, wherein the temperature of the composition ranges from greater than 0° C. to less than 50° C., preferably from 10° C. to 40° C., more preferably from 15° C. to 30° C., and most preferably from 20° C. to 25° C.

Embodiment 25 is a system for producing hydrogen ($H_2$) gas from formaldehyde, the system comprising: (a) a container comprising the composition of any one of embodiments 15 to 24; and (b) a light source for illuminating the composition. Embodiment 26 is the system of embodiment 25, wherein the light source is sunlight or an artificial light source, or a combination thereof. Embodiment 27 is the system of embodiment 26, wherein the artificial light source is a xenon lamp, a fluorescent light, a light emitting diode (LED), and incandescent light, an ultraviolet light, or any combination thereof. Embodiment 28 is the system of any one of embodiments 25 to 27, wherein the container comprises a transparent portion. Embodiment 29 is the system of any one of embodiments 25 to 28, wherein the container comprises an opaque portion. Embodiment 30 is the system of any one of embodiments 25 to 29, wherein the system does not include an external bias to produce $H_2$ gas.

The term "homogeneous" is defined as a reaction equilibrium in which the catalysts reactants, and products are all or substantially all in the same phase (e.g., the catalysts, reactants and products are dissolved or substantially dissolved in the basic aqueous medium).

"Formaldehyde" as used herein includes gaseous, liquid and solid forms of formaldehyde. "Formaldehyde" includes its aldehyde form ($CH_2O$), its hydrated form (methanediol), and its para-formaldehyde form of

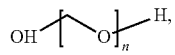

where n can be up to 100.

The "turn over number" or TON," as used herein, means the number of moles of substrate that a mole of catalyst converts in the timeframe of the experiment or before being deactivated. TON is calculated as the number of mmoles of formaldehyde, divided by the number of moles of catalyst unless otherwise indicated.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The terms "wt. %" or "vol. %" refers to a weight or volume percentage of a component, respectively, based on the total weight or the total volume of material that includes the component. In a non-limiting example, 10 grams of a component in 100 grams of the material that includes the component is 10 wt. % of component.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The catalysts of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the catalysts of the present invention are their abilities to catalyze hydrogen production from formaldehyde.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
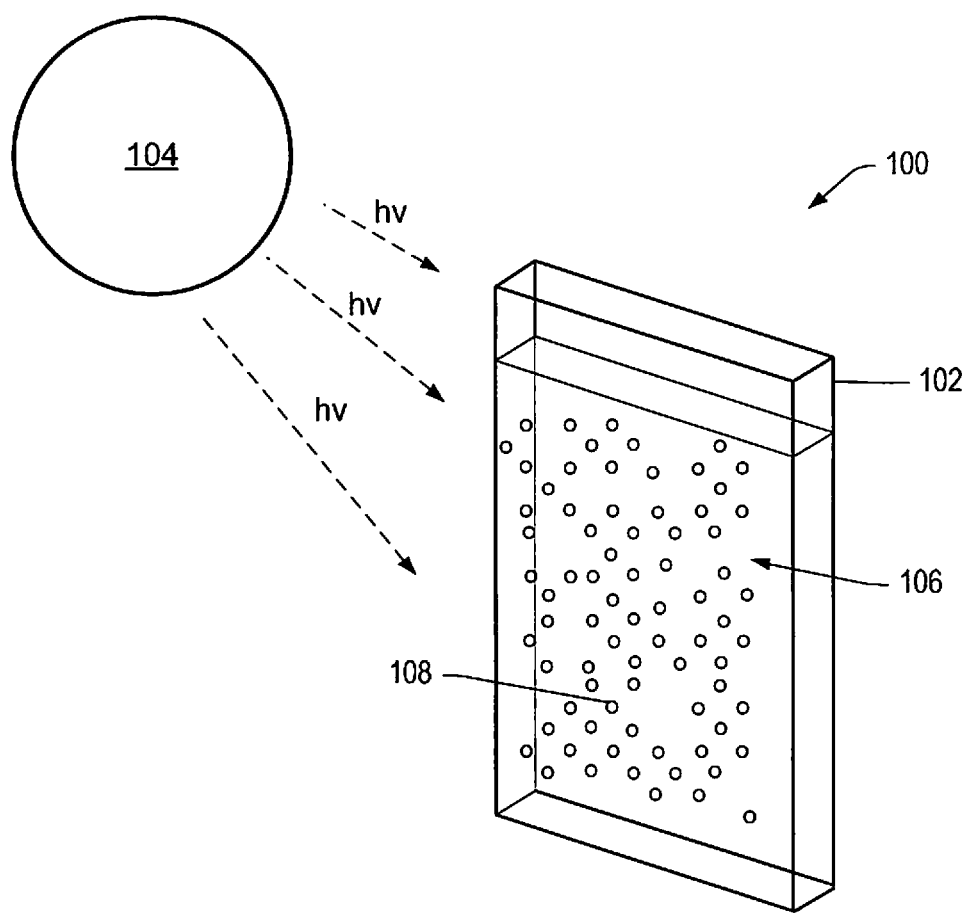
FIG. 1 is a schematic of an embodiment of a reaction system of the present invention.

While the invention is susceptible to various modifications and alternative forms, specific embodiments thereof are shown by way of example in the drawings and may herein be described in detail. The drawings may not be to scale.

DETAILED DESCRIPTION OF THE INVENTION

The present invention provides for an efficient and scalable process for producing hydrogen gas from formaldehyde. The process includes subjecting an aqueous basic solution having an iron containing photocatalyst, formaldehyde (e.g., methanediol or para-formaldehyde or a combination thereof), and a base to light (e.g., natural or artificial light or a combination thereof), and producing hydrogen gas from the formaldehyde. As illustrated in non-limiting embodiments in the examples, this process can have large turn-over numbers, be operated at relatively low temperatures (e.g., room temperatures such as 15° C. to 30° C., preferably from 20° C. to 25° C.) and under a variety of conditions, thereby allowing for the efficient and scalable production of hydrogen gas. In certain instances, production of unwanted by-products such as carbon dioxide can be avoided.

These and other non-limiting aspects of the present invention are discussed in further detail in the following sections.

A. Iron Containing Photocatalyst

The iron containing catalyst can be a saturated 18-electron complex with Fe(II) in an octahedral, strong ligand-field. The iron containing catalyst can undergo reversible dissociation reaction of at least one ligand upon irradiation with visible light. Without wishing to be bound by theory it is believed that the dissociation of at least one organic ligand can produce a transient penta-coordinated 16-electron species isolobal with an organic carbocation. Such an electrophilic species can react with nucleophiles. A non-limiting example of such an iron(II) complex is ferrocyanide ([Fe(CN)$_6$]$^{4-}$). Iron ferrocyanide is available from many commercial manufacturers, for example, Sigma Aldrich® (USA), as sodium ferrocyanide decahydrate ([(CN)$_6$Fe]Na$_4$(H$_2$O)$_{10}$). A non-limiting example of an iron containing catalyst, ferrocyanide, undergoing a reversible dissociation reaction is shown in equation (9) below.

$$[Fe(CN)_6]^{4-} \leftrightarrow [Fe(CN)_5]^{3-} + CN^- \quad (9)$$

The iron containing catalyst can react with nucleophiles in the reaction mixture, for example, hydroxide ion as shown in equation (10) below.

$$[Fe(CN)_5]^{3-} + OH^- \leftrightarrow [Fe(CN)_5OH]^{4-} \quad (10)$$

Without wishing to be bound by theory, it is believed that the [Fe(CN)$_5$OH]$^{4-}$ species is responsible for the reaction with small organic molecules (e.g., formaldehyde in either intact or hydrated form), followed by reductive elimination of hydrogen and concomitant formation of the formate anion as shown in the reaction pathway (A) below. Alternatively, the partly deprotonated form of methanediol (CH$_2$(OH)$_2$), as obtained from the attack of hydroxide ion to p-formaldehyde, may also directly coordinate to the 16-electron [(CN)$_5$Fe]$^{3-}$ intermediate to form the same species as shown in reaction pathway (A) below, where "p-FA" represents para-formaldehyde.

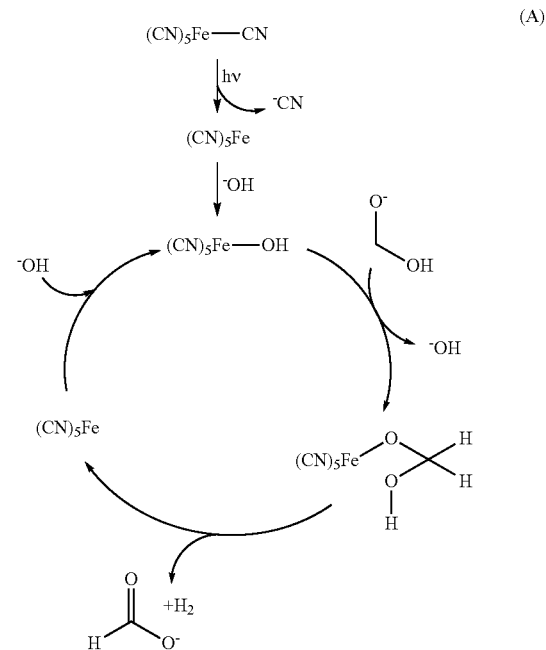

(A)

B. Reactants and Medium
  1. Reactants

The reactants can include any small organic molecule capable of dehydrogenation and a base. The small organic molecule can be an organic compound with a terminal aldehyde (RHCO) or carboxylic acid (RCOOH), where R is H or an alkyl group having 1 to 3 carbons. In a preferred instance, the aldehyde is formaldehyde. The carboxylic acid can be formic acid. Formaldehyde can be formaldehyde, aqueous formaldehyde solutions (for example 37% in water), para-formaldehyde, or combinations thereof para-Formaldehyde is the polymerization of formaldehyde with a typical degree of polymerization of 1 to up to 100 units. Aqueous formaldehyde (methanediol) and para-formaldehyde are available from many commercial manufacturers, for example, Sigma Aldrich® (USA). The basic reagent includes a metal hydroxide (MOH or M(OH)$_2$), where M is a alkali or alkaline earth metal. Non-limiting examples of alkali or alkaline earth metals include lithium, sodium, potassium, magnesium, calcium, and barium. In a preferred embodiment, the base is sodium hydroxide (NaOH). The molar ratio of small organic molecule (e.g., formaldehyde) to base is equal to or less than 2:1, 1.9:1, 1.8:1, 1.7:1, 1.6:1, 1.5:1, 1.2:1, 1.1:1, 1:1, 0.5:1 or any range there between.
  2. Medium The generation of hydrogen can be performed in any type of medium that can solubilize the catalyst and reagents. In a preferred embodiment, the medium is water. Non-limiting examples of water include de-ionized water, salt water, river water, canal water, city canal water or the like.

C. Generation of Hydrogen

As illustrated in the Examples section, hydrogen can be produced by irradiating, with light, an aqueous composition having a basic pH, formaldehyde, and an iron containing photocatalyst. In preferred instances, the iron-containing catalyst and the small organic molecule are partially or fully solubilized within the aqueous composition. FIG. 1 is a schematic of an embodiment of the reaction system 100. Hydrogen generating system 100 includes container 102, light source 104, and aqueous mixture 106. Container 102 can be transparent, translucent, or even opaque such as those that can magnify light (e.g., opaque container having a pinhole(s) or those that include a light source within the container). The aqueous homogeneous mixture 106 includes the aqueous formaldehyde (methanediol), an iron containing catalyst, and a base described throughout the specification. Light source 104 can be natural sunlight or an artificial light source such as light from a xenon lamp, a fluorescent light, a light emitting diode (LED), an incandescent light, an ultraviolet (UV) light, or any combination thereof. In certain instances, a combination of natural and artificial light can be used. The iron containing photocatalyst can be used to catalyze the production of hydrogen from the formaldehyde as shown in reaction pathway (A) above. When equimolar solutions of p-formaldehyde and sodium hydroxide are combined a slow Cannizzaro's disproportionation to MeOH and (HCOO)Na can occur as shown in equation (11) below. The addition of a catalytic amount of the iron containing photocatalyst does not appear to inhibit this disproportionation.

(11)

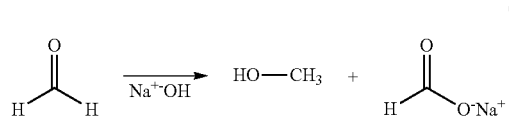

When the aqueous mixture 106 is exposed the light source 104, $H_2$ (gas) 108 is produced. Notably, hydrogen is only evolved when the solution containing the catalyst is exposed to light. No hydrogen is evolved when aqueous formaldehyde and sodium hydroxide solution are exposed to light. Thus, it should be understood that you can either illuminate and then add the catalyst or add the catalyst and then illuminate the solution. In addition to the production of $H_2$, formate (e.g., sodium formate) can be produced as illustrated in the reaction pathway (A) above and equation (12) below. Without wishing to be bound by the theory, the production of hydrogen 108 is in the homogeneous phase of the aqueous mixture. The formate (or formic acid), which is also dissolved in the solution, can then further react as shown in pathway (A) with the iron intermediate (e.g., $[Fe(CN)_5 OH]^{4-}$) to form additional hydrogen.

CH$_2$O(l)+NaOH(aq)→H$_2$(g)+HCOONa(aq)  (12)

ΔGf°=−91 kJ/mol

Notably, no carbon dioxide is formed during the production of hydrogen. Thus, the process can be considered a "green" process. Furthermore, system 100 does not require the use of an external bias or voltage source, although one can be used if so desired. Further, the efficiency of system 100 allows for one to use small organic molecules as a hydrogen storage agent.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Materials and Testing Procedures for Production of Hydrogen from Formaldehyde

Materials.

Paraformaldehyde, 37% formaldehyde solution, and sodium ferrocyanide decahydrate, acetamide were purchased from Sigma-Aldrich® (USA). Formic acid was purchased from Acros Organics (BELGIUM). Sodium thiosulfate was purchased from Oakwood Chemicals (USA). Iodine was purchased from Strem Chemicals, Inc. (USA). Citric acid was purchased from Fisher Scientific (USA). Acetic anhydride was purchased from VWR International (USA). Chemicals were used without further purification. If not specifically mentioned, all reactions were carried out in distilled water without degassing or other modifications.

Analytical Equipment.

pH measurements were taken with a Hanna HI 2210 benchtop pH meter with a general purpose combination pH electrode, both purchased from Sigma-Aldrich®. Powder XRD diffractograms were obtained on a Rigaku Ultima IV diffractometer set to 2 2θo/min from 10-70 2θo. UV-Vis spectra were obtained on a Specmate UV-1100 spectrometer. Infrared spectra were obtained on a Nicolet 6700 FTIR with diamond ATR between 650-4000 cm$^{-1}$, at 128 scans with a resolution of 4 cm$^{-1}$.

Product Analysis.

$H_2$, $CO_2$, CO and $O_2$ gas identification and detection was carried out with an Agilent 7820A GC equipped with a thermal conductivity detector (TCD), using an Agilent GS-CarbonPlot column (for $CO_2$) or Agilent HP-Molesieve column (for all other gasses).

Determination of Reaction Kinetics.

The gaseous outflow of the reaction mixture was hooked up to a Restek ProFLOW 6000 Electronic Flow-meter connected to a computer.

Determination of pH.

Two identical solutions of 66.6 mmol of p-formaldehyde and 375 mmol of NaOH were prepared simultaneously and were measured to have identical pH values. Both solutions were then illuminated and to one solution, 2 mmol of sodium ferrocyanide was added, and the pH values were measured at regular intervals for 300 minutes.

Determination of Formate Concentration.

Concentration of dissolved formate was determined according to a modified colorimetric procedure by Sleat et al. (*Appl. Environ. Microbiol.* 1984, 47, 884). An aliquot of the reaction mixture (0.5 mL) was added to acetamide (10%, 2 mL) and citric acid (0.05%) dissolved in a 1:1 mixture of isopropanol and water. To the test mixture, sodium acetate (0.1 mL of 30%) and of acetic anhydride (7 mL) were added. The test mixture was shaken and incubated at room temperature for 60 minutes and measured spectrophotometrically at 510 nm. The concentration was determined against a standard curve.

Determination of Formaldehyde Concentration.

Formaldehyde concentrations were determined through iodine/sodium thiosulfate titrations. To an aliquot of the reaction mixture (10 mL), de-ionized water (20 mL), iodine (25 mL, 0.05M/L in methanol) and sodium hydroxide (10 mL, 1.0M) were added and stirred for 10 minutes followed by the addition of sulfuric acid (15 mL, 1.0M). The sample solution was then titrated with sodium thiosulphate, with addition of a 1% starch solution as an indicator once the solution turned light yellow. The concentration of formaldehyde was then calculated by a standard curve.

Isolation of Iron Oxide.

Iron oxide was collected after allowing a standard reaction to continue for 5 days with a continuous addition of para-formaldehyde and sodium hydroxide. A brown-red precipitate slowly formed which was centrifuged, washed and dried.

Example 2

Generation of Hydrogen from Para-Formaldehyde

Figure 2:
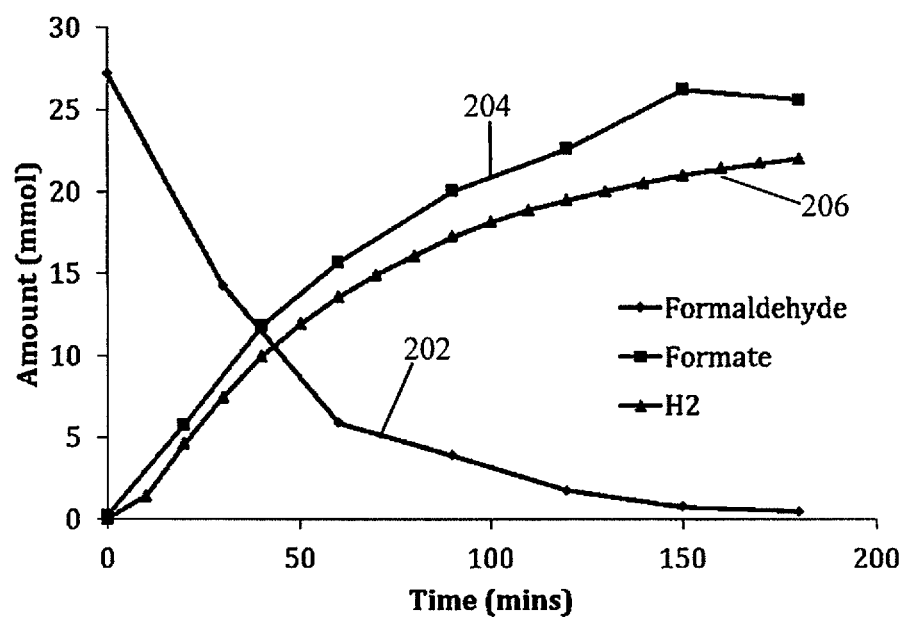
FIG. 2 are graphs of the amount of products formed or consumed over time during irradiation.

Formaldehyde (50 mmol of p-formaldehyde or 37% formaldehyde solutions) was added to NaOH (250 mmol) in $H_2O$. The photocatalyst, sodium ferrocyanide ($[(CN)_6Fe]Na_4(H_2O)_{10}$), (500 μmol (1 mol %)) was added to the solution. The reaction mixture was illuminated with a 300 W Xe arc-lamp and the evolution of hydrogen was monitored. In this experiment 825 mL of hydrogen was generated over a 300 minute time period. The disappearance of formaldehyde was monitored by the titration method described above, while the formation of sodium formate was monitored by the colorimetric method described above. FIG. 2 are graphs of formation of products versus reagent consumption during irradiation. Data 202 is the amount of formaldehyde over time. Data 204 is the amount formate formed over time, and data 206 is the amount of hydrogen produced over time. As shown in FIG. 2, hydrogen and formate were both produced, which indicated that formaldehyde and hydroxide ion were both consumed in the reaction process.

Example 3

Catalytic Versus Non-Catalytic Generation of Hydrogen from Formaldehyde

Non-Catalyzed Procedure.

Formaldehyde (66.6 mmol of p-formaldehyde) was added to NaOH (375 mmol) in $H_2O$. The reaction mixture was illuminated with a 300 W Xe arc-lamp. The change in pH was measured. No hydrogen evolution was detected. No catalyst was added to this solution.

Catalyzed Procedure.

Formaldehyde (66.6 mmol of p-formaldehyde) was added to NaOH (375 mmol) in $H_2O$. The photocatalyst, sodium ferrocyanide ($[(CN)_6Fe]Na_4(H_2O)_{10}$), (2 mmol) was added to the solution (total volume 300 mL). The reaction mixture was illuminated with a 300 W Xe arc-lamp, the evolution of hydrogen was monitored, and the change in pH was measured.

Figure 3:
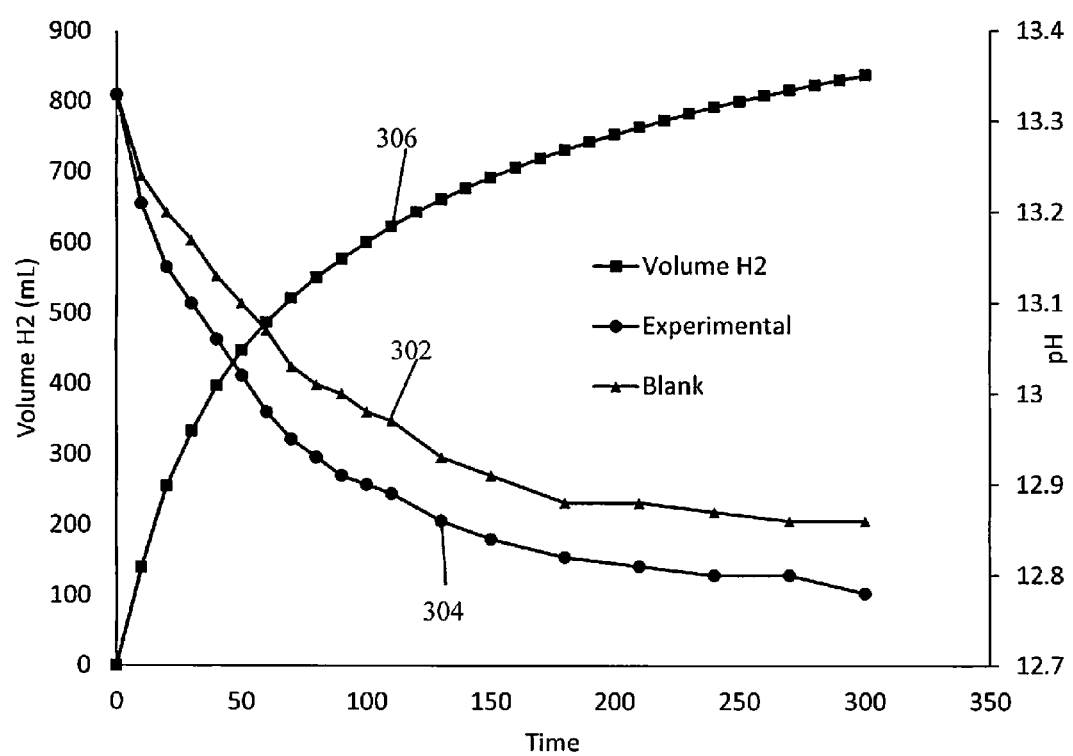
FIG. 3 are graphs of the hydrogen production and change of pH of the non-catalyzed reaction and the catalyzed reaction over time.

FIG. 3 are graphs of the change of pH of the non-catalyzed reaction and the catalyzed reaction over time. Data 302 is the non-catalyzed reaction ("blank"). Data 304 is the catalyzed reaction of the present invention. Data 306 is the hydrogen production from the catalyzed reaction of the present invention. As shown in FIG. 3, the pH in both a catalyzed standard $H_2$ evolving reaction and a non-catalyzed reaction decrease over time. The pH of the catalyzed reaction had a faster rate with respect to $H_2$ production versus the non-catalyzed reaction (time 0 until no more hydrogen evolution was detected, about 30 min, See, FIG. 3), but overtime the rate of pH change of the catalyzed reaction became similar to the rate of pH change of the non-catalyzed reaction. Without wishing to be bound by theory it is believed that decrease in the pH after no more hydrogen evolution was detected (about 30 min.) is due to the Cannizzaro reaction (See, equation 11). Also, without wishing to be bound by theory, it is believed that the initial rate of pH change at the beginning of the catalyzed reaction indicated that hydroxide ion is also required to activate the catalyst.

Example 4

Figure 4:
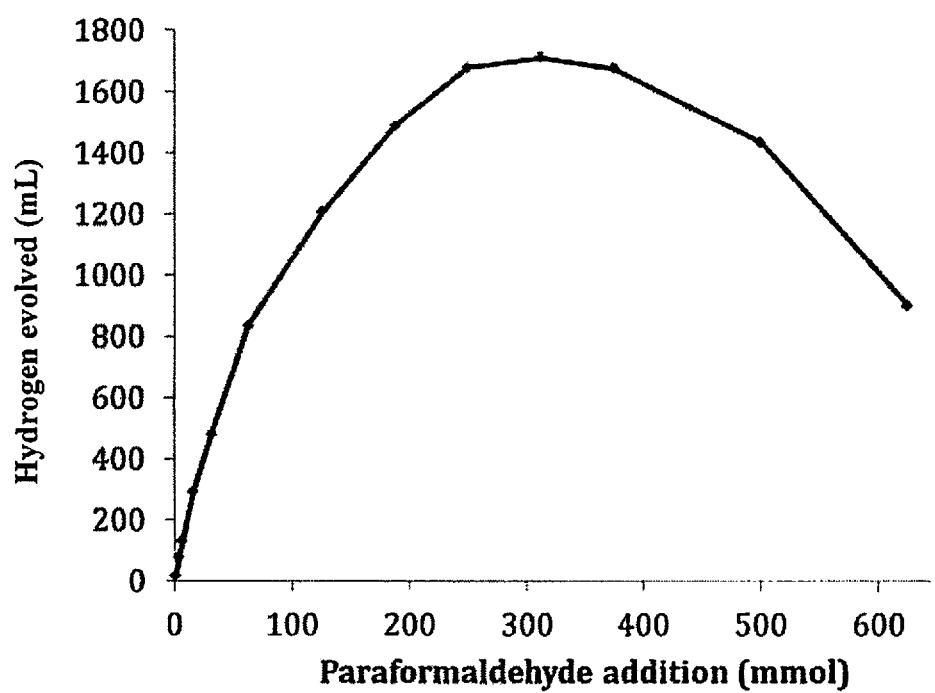
FIG. 4 is a graph of the change of hydrogen evolution versus the amount of p-formaldehyde added at a constant amount of NaOH.

Variation of Formaldehyde Concentration p-formaldehyde in the amounts listed in Table 1 were added to NaOH (375 mmol) in $H_2O$. The photocatalyst, sodium ferrocyanide ($[(CN)_6Fe]Na_4(H_2O)_{10}$), (0.5 mmol) was added to the solution (total volume 250 mL). The amount of hydrogen evolution was measured. The reaction mixture was illuminated with a 300 W Xe arc-lamp and the evolution of hydrogen was monitored. FIG. 4 is a graph of the change of hydrogen evolution versus the amount of p-formaldehyde added at a constant amount of NaOH. From the data in FIG. 4, at low initial concentrations of p-formaldehyde, the conversion to hydrogen was deemed to be as high as 100%, but decreased when the concentration levels of the p-formaldehyde increased. The maximum total productivity was reached when the amount of p-formaldehyde was approximately equimolar with NaOH (p-formaldehyde/NaOH=1.2). At higher ratios hydrogen production was not as pronounced.

p-formaldehyde in concentrations listed in Table 1 was added to 300 mL of 1.125 M NaOH (about 0.34 mmol) in $H_2O$. The photocatalyst, sodium ferrocyanide ($[(CN)_6Fe]Na_4(H_2O)_{10}$), (0.6 mmol) was added to the solution and the evolution of hydrogen was monitored. The reaction mixture was illuminated with a 300 W Xe arc-lamp. The amount of hydrogen evolution was measured. Table 1 is a listing of the amount of hydrogen evolved and the catalyst turnover.

TABLE 1

| Formaldehyde (mmoles) | Hydrogen evolved (mmoles) | Yield (%) | Turnovers |
|---|---|---|---|
| 0.33* | 0.33 | 100% | 0.56 |
| 3.33* | 3.15 | 94% | 5.25 |
| 6.67* | 5.23 | 78% | 8.72 |
| 33.33* | 19.62 | 59% | 32.70 |
| 66.67* | 34.13 | 51% | 56.88 |
| 333.33* | 69.90 | 21% | 116.49 |
| 375.00** | 59.35 | 16% | 98.92 |

*Commercial para-formaldehyde.
**Commercial Formalin solution.

Example 5

Effect of Radiation

Figure 5:
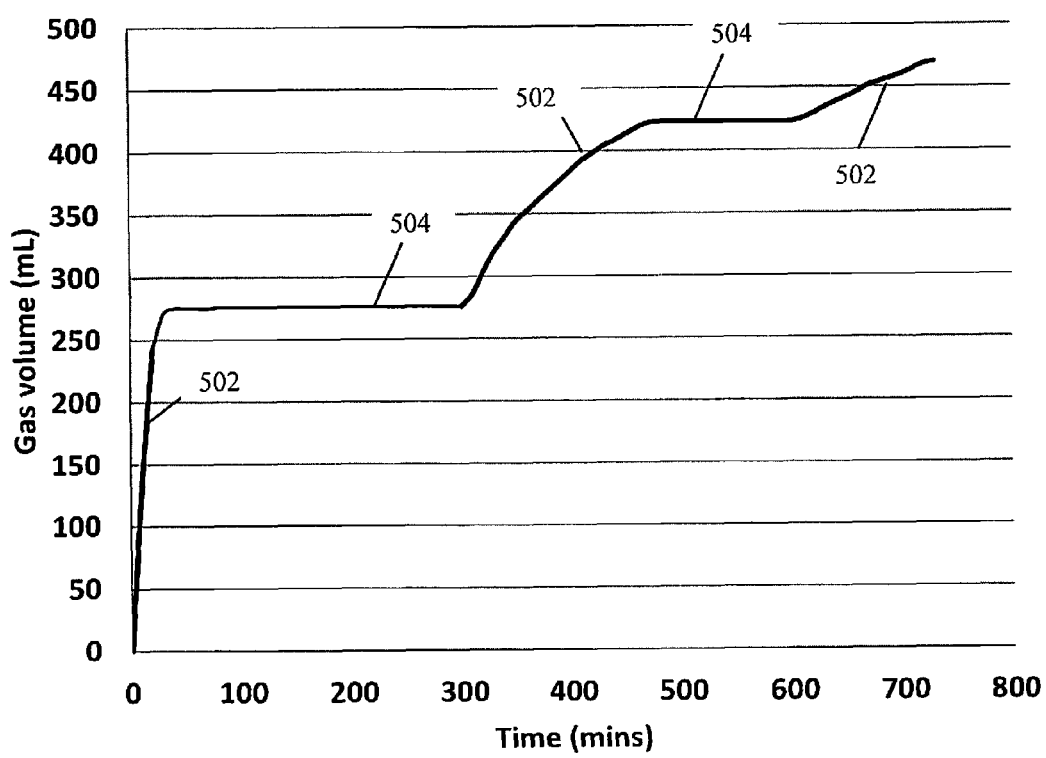
FIG. 5 is a graph of the effect of illumination on hydrogen evolution from ferrocyanide catalysis over time.

Formaldehyde (66.6 mmol of p-formaldehyde) was added to NaOH (325 mmol) in $H_2O$. The photocatalyst, sodium ferrocyanide ($[(CN)_6Fe]Na_4(H_2O)_{10}$), (2 mmol) was added to the solution (total volume 300 mL). The reaction mixture was illuminated with a 300 W Xe arc-lamp and the evolution of hydrogen was monitored. FIG. 5 is a graph of the effect of illumination on hydrogen evolution from ferrocyanide catalysis over time. The portion of the lines that have a slope (data 502, △) represents periods when catalyst is illuminated and the substantially flat portions of the line (data 504, ●)

represents periods when catalyst is in the dark. From the data in FIG. 5, it was determined that when irradiation with visible light was interrupted, the hydrogen evolution stopped and it was either restarted or arrested by intermittently turning the light on and off. In other words, the catalytic system of the present invention is light-switchable.

Example 6

Hydrogen Rate of Formation and Production

Figure 6:
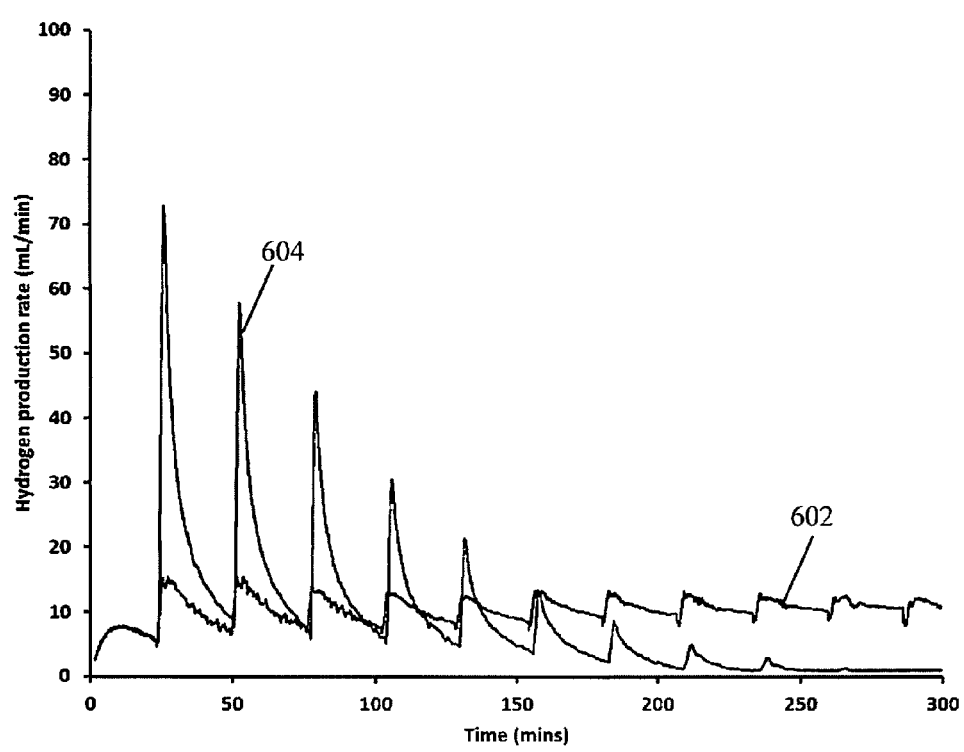
FIG. 6 are graphs of the hydrogen flow in ml/min versus time in minutes at various p-formaldehyde and NaOH concentrations.
Figure 7:
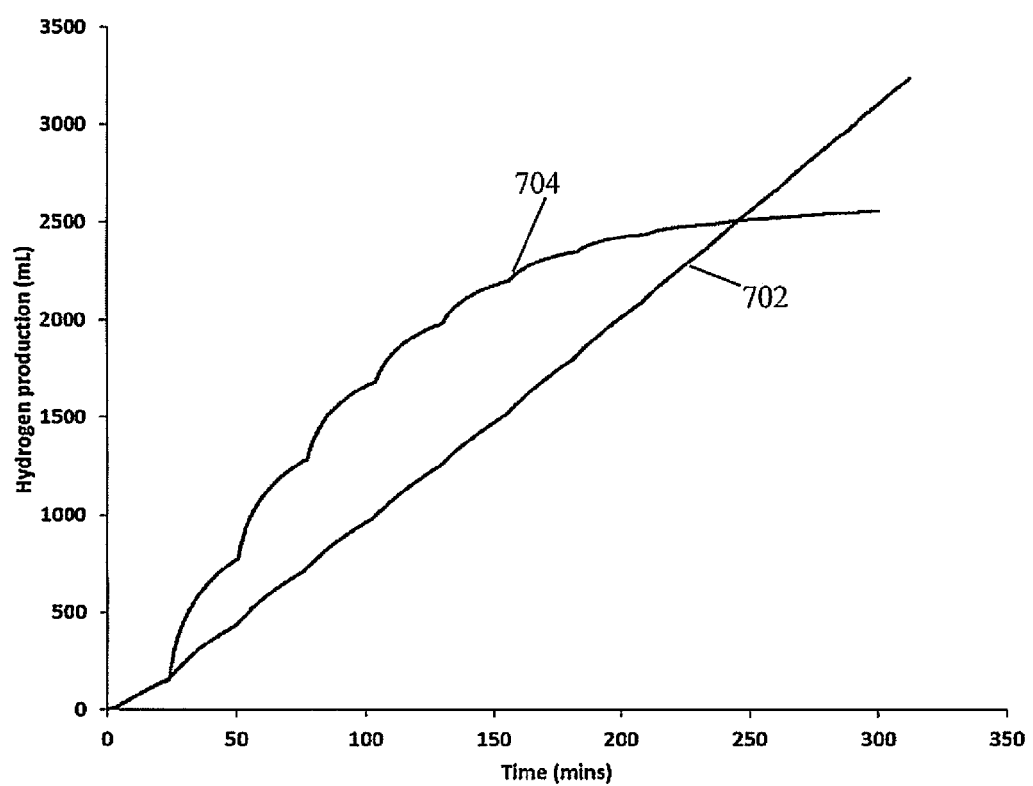
FIG. 7 are graphs of the hydrogen production versus time in minutes at various p-formaldehyde and NaOH concentrations.

Formaldehyde (50 mmol of p-formaldehyde) was added to NaOH (250 mmol) in $H_2O$. The photocatalyst, sodium ferrocyanide ($[(CN)_6Fe]Na_4(H_2O)_{10}$), (0.5 mmol) was added to the solution (total volume 300 mL). The reaction mixture was illuminated with a 300 W Xe arc-lamp and the evolution of hydrogen was monitored. An initial 0.25 moles of NaOH was added to both solutions to ensure that the pH was suitable for deprotonation of methanediol. Every 30 minutes, 50 mmol p-formaldehyde and either 50 mmol or 200 mmol NaOH were added. The hydrogen rate of formation (FIG. 6) and productivity (FIG. 7) were monitored by regularly adding p-formaldehyde and NaOH in both a 1:5 and 1:1 molar ratio. FIG. 6 are graphs of the hydrogen flow in ml/min versus time in minutes at various p-formaldehyde and NaOH concentrations. Data 602 is at 50 mmol of NaOH and data 604 is at 200 mmol of NaOH. FIG. 7 are graphs of the hydrogen production versus time in minutes at various p-formaldehyde and NaOH concentrations. Data 702 is at 50 mmol of NaOH and data 704 is at 200 mmol of NaOH. Elevated hydrogen evolution rates were observed when the ratio of p-formaldehyde to NaOH was 1:5, which slowed before the next sample was added. However, with each addition of p-formaldehyde and NaOH, the maximum rate decreased rapidly and after the $10^{th}$ addition of regents, the rate was zero. This drop was attributed to decomposition of the catalyst to $Fe_2O_3$ in highly basic conditions. As shown in FIG. 7, addition of 1:1 p-formaldehyde to NaOH portions (data 602) resulted in a steady productivity being reached, with no decline of catalytic activity for 350 minutes. Within each addition, a reduction in the initial spike of hydrogen production is observed, which stabilizes into a nearly continuous release of 10 mL of hydro-gen per minute.

Example 7

Effect of Water Purity on Catalytic Activity

Figure 8:
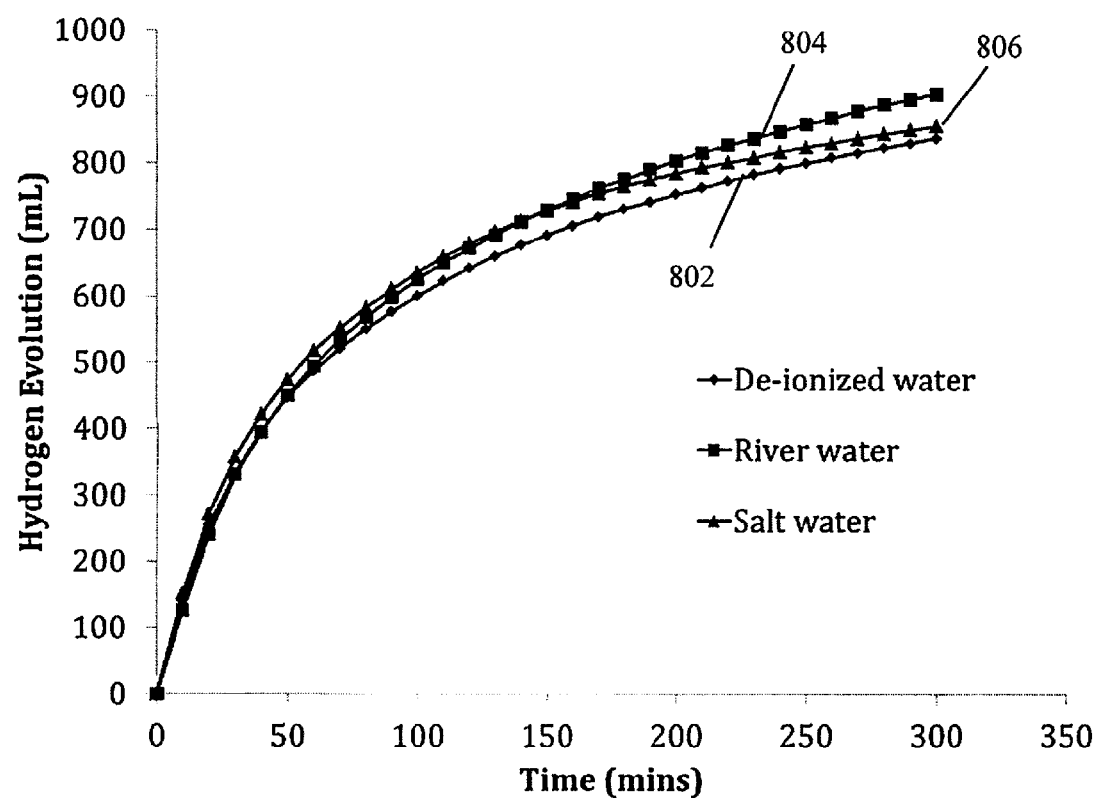
FIG. 8 are graphs of hydrogen production in mL versus time in min of the production of hydrogen using various types of water.

Formaldehyde (66.6 mmol of p-formaldehyde) was added to NaOH (375 mmol) in $H_2O$. The photocatalyst, sodium ferrocyanide ($[(CN)_6Fe]Na_4(H_2O)_{10}$), (3 mmol) was added to the solution (total volume 300 mL). Three types of water de-ionized water, river water and salt water were evaluated. FIG. 8 are graphs of hydrogen production in mL versus time in min of the production of hydrogen using various types of water. Data 802 is hydrogen production using de-ionized water, data 804 is hydrogen production using city canal water, and data 806 is hydrogen production using salt water. As determined from the data in FIG. 8, the reaction rates and final production from the three sources were nearly identical. Thus, the choice of water source (i.e., distilled water, 3.5% NaCl solutions (to match the average salinity of the ocean), or water taken directly from city canal water), had no significant effect on the activity of the catalyst.

Example 8

Long Range Catalytic Runs

Figure 9:
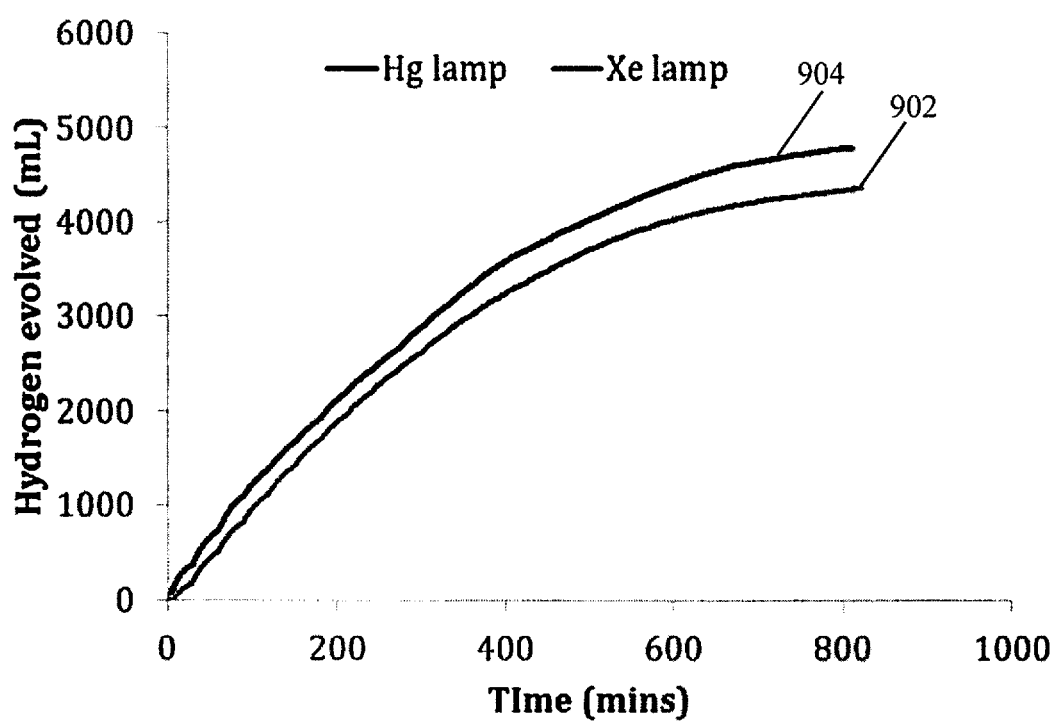
FIG. 9 are graphs of hydrogen evolution versus time using different light sources.

Formaldehyde (0.5 mol of p-formaldehyde) was added to NaOH (0.25 mol) in $H_2O$. The photocatalyst, sodium ferrocyanide ($[(CN)_6Fe]Na_4(H_2O)_{10}$), (120 mg) was added to the solution (total volume 300 mL). The reaction mixture was run twice with two different light sources, a 300 W Xe arc-lamp and a Hg lamp. The evolution of hydrogen was monitored. FIG. 9 are graphs of hydrogen evolution versus time using different light sources. Data 902 is the generation of hydrogen using the method of the present invention using a Xenon arc-lamp as a light source. Data 904 is the generation of hydrogen using the method of the present invention using the Hg lamp as a light source. From the data in FIG. 9, it was determined that the reactions were uninterruptedly carried out for 16 h with periodical additions of NaOH/p-formaldehyde every 30 min. Over time the catalytic system slowly decayed after having produced about 4.8 L of pure hydrogen (14.5% based on p-formaldehyde). At this stage a significant amount of $Fe_2O_3$ become visible, which was isolated and characterized as described in Example 1.

The invention claimed is:

1. A method of producing hydrogen from formaldehyde, the method comprising:
   (a) obtaining an aqueous mixture having a basic pH and comprising formaldehyde, an iron containing photocatalyst, and a base; and
   (b) subjecting the aqueous mixture to light to produce hydrogen (H2) gas from the formaldehyde;
   wherein the iron containing photocatalyst is an Fe(II) containing photocatalyst comprising at least one reversibly dissociable ligand and can undergo reversible dissociation of the at least one reversibly dissociable ligand upon irradiation with visible light.

2. The method of claim 1, wherein the molar ratio of formaldehyde to base is 0.5:1 to 1.5:1.

3. The method of claim 1, wherein the iron containing photocatalyst and the formaldehyde are each homogenously present in the aqueous mixture.

4. The method of claim 1, wherein the formaldehyde is para-formaldehyde, hydrated formaldehyde, or a combination thereof.

5. The method of claim 1, wherein the formaldehyde is para-formaldehyde.

6. The method of claim 1, wherein the Fe(II) containing photocatalyst comprises ferrocyanide ($Fe(CN)_6)^{4-}$ or a salt thereof.

7. The method of claim 1, wherein the mixture has a pH from 10 to 14.

8. The method of claim 1, wherein the method further produces formic acid, and wherein $H_2$ gas is further produced from the formic acid.

9. The method of claim 1, wherein the temperature of the mixture in step (b) ranges from 10° C. to 40° C.

10. The method of claim 1, wherein an external bias is not used to produce $H_2$ gas.

* * * * *